United States Patent [19]
Yamamoto

[11] Patent Number: 4,912,694
[45] Date of Patent: Mar. 27, 1990

[54] INFORMATION REPRODUCING METHOD AND APPARATUS INCLUDING COMPARISON OF A PARITY VALVE COUNTED BY A FLIP-FLOP WITH A PARITY BIT ATTACHED TO A DATA UNIT

[75] Inventor: Masakuni Yamamoto, Yokohama, Japan

[73] Assignee: Canon Kabushiki Kaisha, Tokyo, Japan

[21] Appl. No.: 156,980

[22] Filed: Feb. 18, 1988

[30] Foreign Application Priority Data

Feb. 18, 1987 [JP] Japan ................................. 62-033453
Feb. 18, 1987 [JP] Japan ................................. 62-033454
Feb. 18, 1987 [JP] Japan ................................. 62-033455

[51] Int. Cl.⁴ ............................................. G11B 5/09
[52] U.S. Cl. ........................................ 369/59; 369/48
[58] Field of Search ................... 360/53, 31, 38.1; 369/59, 53, 54, 58, 48; 371/13, 51, 49; 358/336

[56] References Cited
U.S. PATENT DOCUMENTS 3,046,523 7/1962 Batley .................................. 371/49
3,122,630 2/1964 Malden ................................. 371/49
4,689,767 8/1987 Stevenson et al. .................... 360/39

FOREIGN PATENT DOCUMENTS 53-12236 3/1978 Japan ................................... 371/13
54122602 4/1981 Japan ................................... 371/13

OTHER PUBLICATIONS

Drexler Technology Corporation, "Drexon Laser Memory Card Quarterly Report No. 4," 10-1983, pp. 1-37.

Primary Examiner—Vincent P. Canney
Attorney, Agent, or Firm—Fitzpatrick, Cella, Harper & Scinto

[57] ABSTRACT

In an information reproducing apparatus and method for reproducing information from an information recording medium containing plural digital information data units and a parity bit attached to each data unit, the plural data units and parity bits of the recording medium are read plural times, the parity of each of plural data units thus read is counted, the parity value thus counted is compared with the parity bit value read as above, and the read information with least number of parity errors is selected to be output, based on the result of the above comparison.

10 Claims, 14 Drawing Sheets

FIG. 9
| SYNCHRO SIGNAL | R LINE | START BIT | MARK SIGNAL | BAND NUMBER | BLOCK NUMBER | ECC DATA | TRACK NUMBER | DATA PARITY | TRACK NUMBER PARITY | DUMMY DATA |
FIG. 10
| SYNCHRO SIGNAL | R LINE | START BIT | USER DATA | ECC DATA | TRACK NUMBER | DATA PARITY | TRACK NUMBER PARITY | DUMMY DATA |
FIG. 11
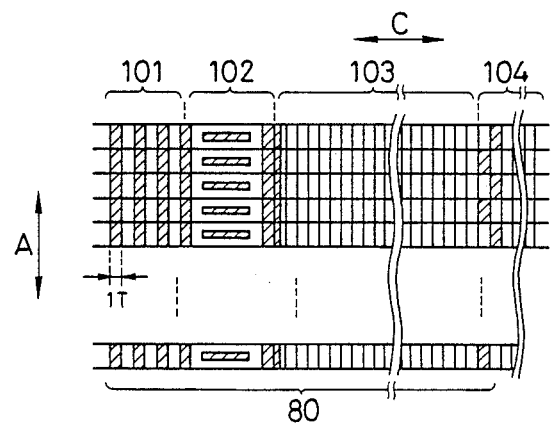
FIG. 12
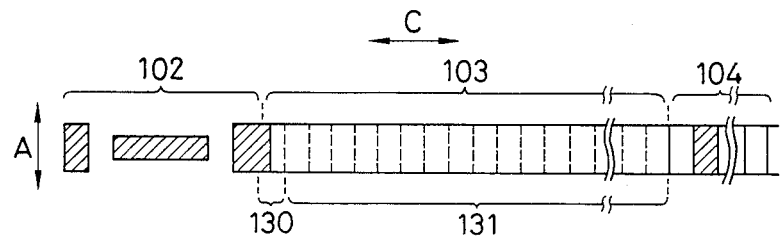

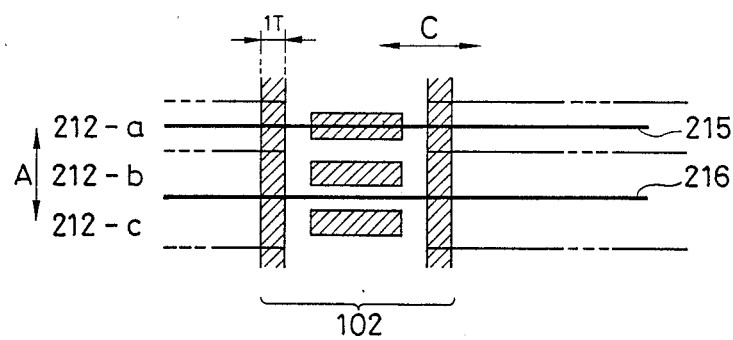
FIG. 13
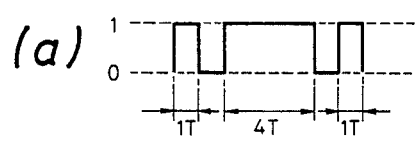
FIG. 14
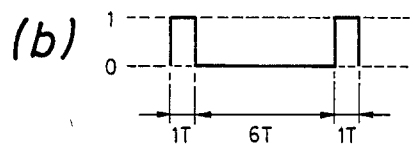
FIG. 15
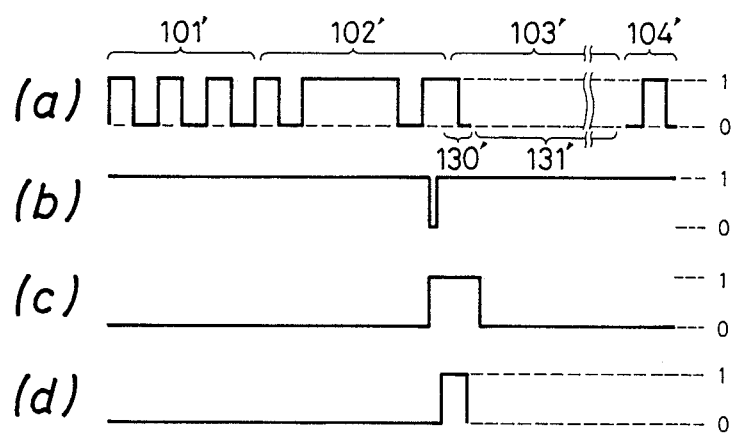

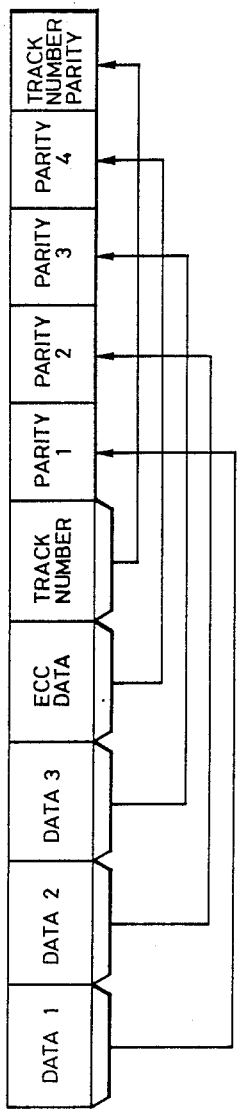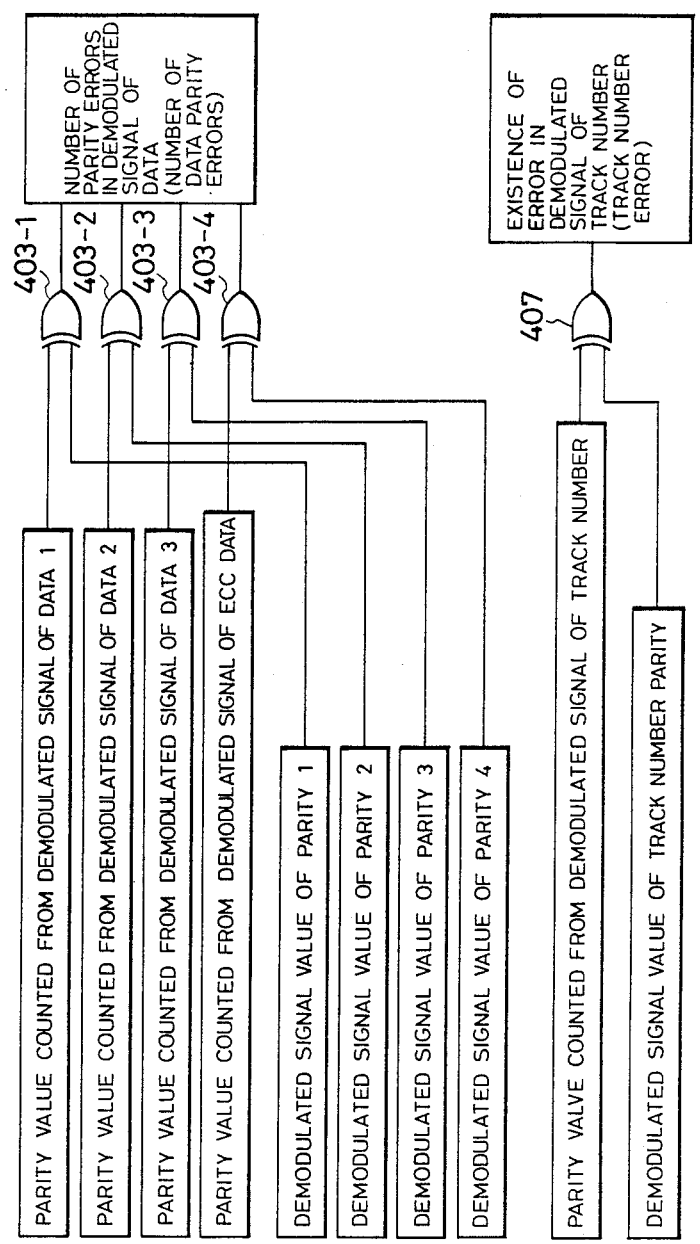
FIG. 16
FIG. 17A
FIG. 17B

INFORMATION REPRODUCING METHOD AND APPARATUS INCLUDING COMPARISON OF A PARITY VALVE COUNTED BY A FLIP-FLOP WITH A PARITY BIT ATTACHED TO A DATA UNIT

BACKGROUND OF THE INVENTION

1. Field of the Invention

The present invention relates to an information reproducing apparatus, and more particularly to such an apparatus for reading the same information plural times and selecting one of the plural readings for information reproduction, adapted for use, for example, in an optical information reproducing apparatus.

2. Related Background Art

Reproduction of information utilizing an optical information recording medium such as a compact disk or an optical file has become popular in recent years. Also, more recently, there has been investigated reproduction of information utilizing a cardshaped optical information recording medium (hereinafter called an optical card) of superior portability compared with the above-mentioned recording media and having a relatively large memory capacity.

FIG. 1 is a schematic plan view showing an example of the recording format on such an optical card.

As shown in FIG. 1, the optical card 1 is provided thereon with a recording area 2, consisting of an array of plural bands 3. Each band 3 consists of an array of plural information tracks 4, each having a storage capacity of several tens to a hundred bits. The bands are separated mutually by reference lines 5. An arrow A shows the moving direction of the optical card 1 in the reproduction of information, and an arrow C indicates the scanning direction of an optical head for information reading at the reproduction of information.

FIG. 2 is a partial magnified schematic view of the above-explained recording format of the optical card, showing an end of the optical card 1 in the direction A.

In FIG. 2, a hatched area indicates information "1", while a blank area indicates information "0". In an information track area 201, a linear array of information bits in the direction C constitutes an information track. A band 3 is composed of reference lines 5 and an information track area 201. The band 3 extends in the up and down directions in FIG. 2.

FIG. 3 is a schematic view of an apparatus for reproducing information from an optical card having the above-mentioned recording format, and FIG. 4 is a partial perspective view thereof.

In FIGS. 3 and 4, the optical card 1 can be reciprocated in the direction A by a rotary mechanism 6. The information recorded on the optical card 1 is read and reproduced, track by track, by an optical head 11. At first the light from a light source 7 such as a light-emitting diode is focused by a lens system 8 and illuminates the optical card 1. Thus, the image of a track on said optical card is focused, by an imaging optical system 9, on a linear CCD sensor array 10. Since the optical card 1 moves in the direction A, the image of the information tracks correspondingly moves on the sensor array 10. The sensor array 10 scans the image several times while each information track is focued on the sensor array 10. In this manner, the information recorded in information tracks of a certain band is reproduced, and then the optical head 11 is suitably moved in a direction C for focusing an information track of another desired band on the sensor array, thereby reproducing the recorded information in the same manner as described before.

The data recorded on the optical card 1 are generally encoded by 4/5 conversion, MFM modulation, etc. In the 4/5 conversion, the data after conversion show bit inversion intervals of 1T, 2T and 3T only (wherein T is the minimum interval of bit inversion by modulation). Also, in the MFM modulation, the data after modulation show bit inversion intervals of 1T, 1.5T and 2T only. Consequently, the reference line can be easily distinguished from the information track by forming, in the reference line 5, a bit pattern of a larger inversion interval than the maximum bit inversion internal appearing in the information track 4. For this purpose a pattern with a bit inversion interval of 4T in the case of 4/5 conversion, or of 3T in the case of MFM modulation can be formed in the reference line.

Also, the neighboring tracks can be distinguished by alternately inverting the patterns of the reference lines 5 of the tracks neighboring in the direction A as shown in FIG. 2.

FIG. 5 is a block diagram of a reproducing apparatus used for reproducing the information recorded on the above-described optical card.

In FIG. 5, a sensor array 10 is driven by a drive clock signal 307 from a sensor array driver 306, and the output signal of the sensor array is amplified in the driver 306 and is supplied as a video signal 309 to a binary digitizing circuit 310. An NRZI signal 311 obtained in the circuit 310 is supplied to a clock reproducing circuit 312, a demodulator circuit 314 and a reference line detecting circuit 316.

The clock reproducing circuit 312 extracts a clock signal 313 from the NRZI signal 311 and supplies it to the demodulator circuit 314, which generates a demodulated NRZ signal 315 in response to the clock signal 313 and the NRZI signal 311.

On the other hand, the reference line detecting circuit 316 receives a clock signal 318 obtained by dividing the drive clock signal 307 in a frequency divider circuit 317 and the NRZI signal from the binary digitizing circuit 310, and supplies the demodulator circuit 319 with a reference line detection signal 319.

The demodulating operation of the demodulator circuit 314 is turned on and off according to the reference line detection signal 319, so that the data read between two reference line detection signals are released as an output signal 315.

In the above-explained reproduction of the information recorded on an optical card, since the scanning operation of the sensor array 10 is not synchronized with the relative movement of the optical card 1 with respect to the sensor array, the reproduced information is obtained usually by reading the same information track plural times and selecting the information of one of such plural readings. Such selection of information can be achieved, for example, by selecting the first information obtained in a proper manner.

However, errors may be generated by various causes in the process of reproducing information from the optical card 1, so that the signals reproduced from the same information track are not necessarily same.

Consequently, in an information reproducing apparatus, it is desirable to provide the information of highest accuracy among those obtained in plural readings.

SUMMARY OF THE INVENTION

A first object of the present invention is to provide an information reproducing apparatus which reads the same information plural times and selects one of said plural readings as the reproduced information, wherein said apparatus is capable of selecting the information of highest accuracy.

A second object of the present invention is to provide a parity check process not requiring a complex circuit structure even when the units of parity bit addition are increased.

Still other objects of the present invention will become fully apparent from the following description of the preferred embodiments.

BRIEF DESCRIPTION OF THE DRAWINGS

FIG. 9 is a schematic view showing the structure of a block mark track;

FIG. 10 is a schematic view showing the structure of a data track;

FIG. 11 is a partial magnified view of the recording area of an optical card;

FIG. 12 is a partial magnified view thereof;

FIG. 13 is a chart showing the function of a discriminating area detection circuit;

FIGS. 14a and b are charts showing the output signal of a line sensor;

FIGS. 15a through d are charts showing the function of an information demodulator circuit;

FIG. 16 is a schematic view showing the details of a part of a data track of the optical card;

FIGS. 17A and 17B, are charts schematically showing the function of a parity check circuit;

DETAILED DESCRIPTION OF THE PREFERRED EMBODIMENTS

Now the present invention will be clarified in detail by embodiments thereof shown in the attached drawings.

Figure 1:
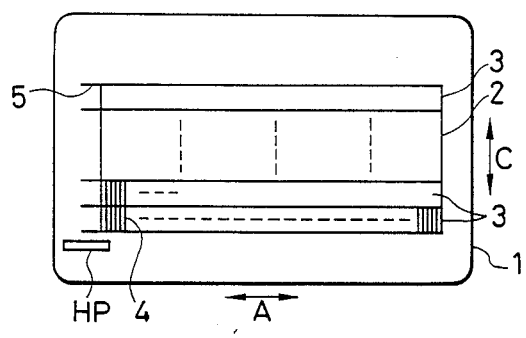
FIG. 1 is a schematic plan view of a recording format of an optical card.
Figure 2:
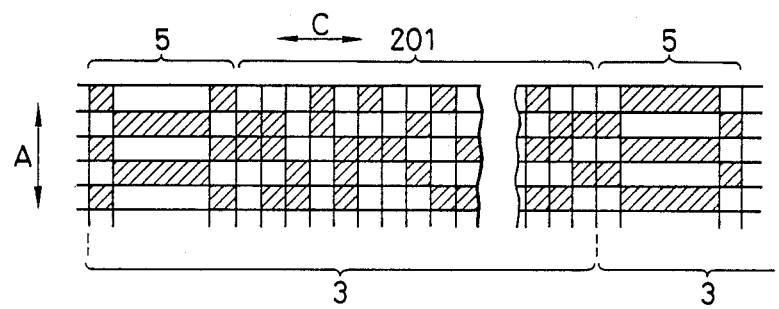
FIG. 2 is a schematic partial magnified view thereof.
Figure 3:
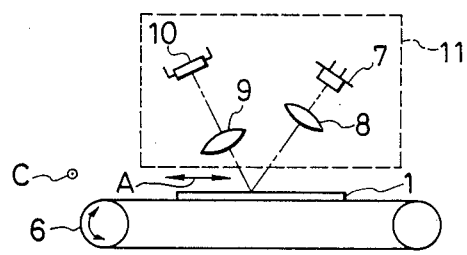
FIG. 3 is a schematic view of an information reproducing apparatus for an optical card.
Figure 4:
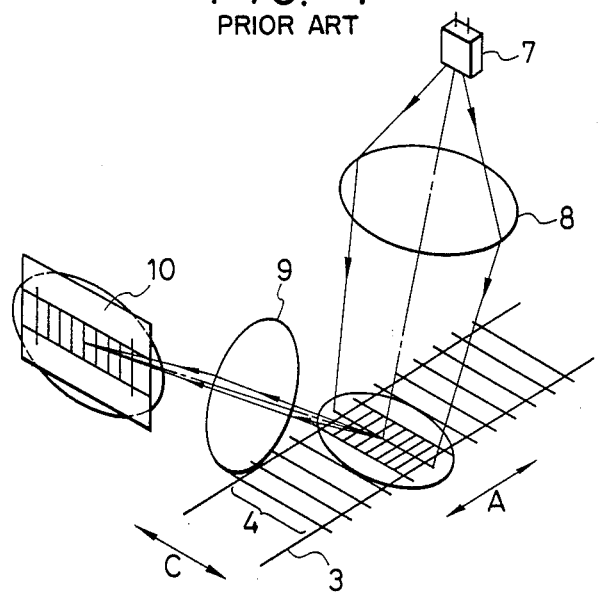
FIG. 4 is a partial perspective view of said apparatus.
Figure 5:
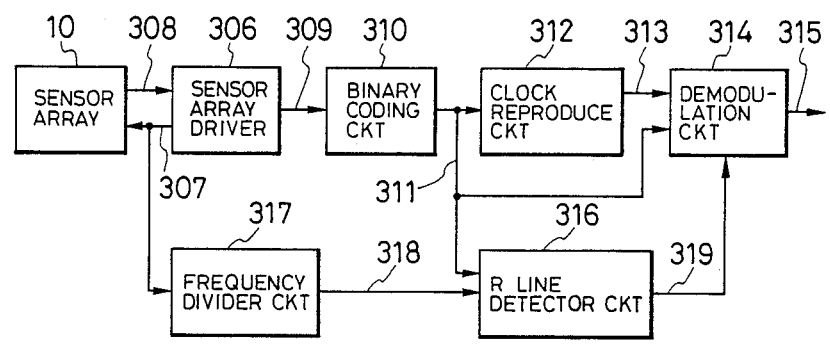
FIG. 5 is a block diagram of an information reproducing apparatus for an optical card.
Figure 6:
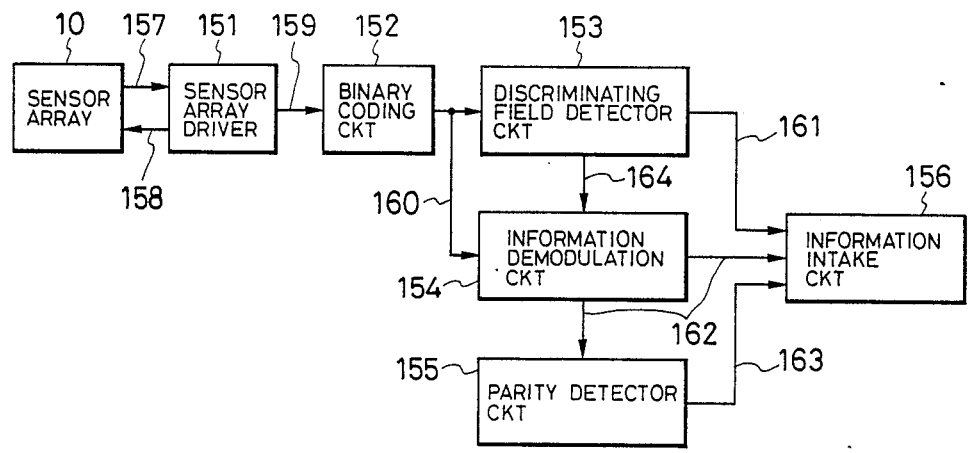
FIG. 6 is a block diagram of an information reproducing apparatus constituting a first embodiment of the present invention.

FIG. 6 is a block diagram of an embodiment of the information reproducing apparatus of the present invention, applied to an optical information reproducing apparatus for an optical card and having a structure similar to that shown in FIG. 3.

Figure 7:
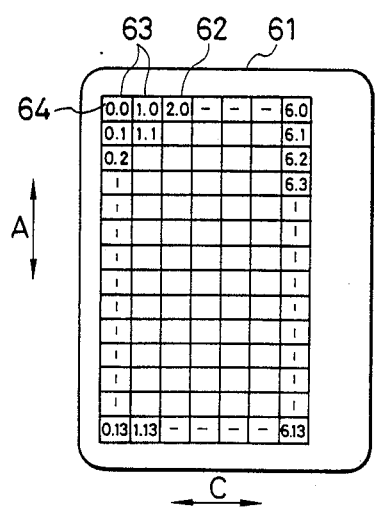
FIG. 7 is a schematic plan view of a recording format of an optical card.

FIG. 7 is a schematic plan view of an example of a recording format of an optical card, from which the recorded information is reproduced by the apparatus of the present embodiment.

As shown in FIG. 7, the optical card 61 is provided thereon with a recording area 62, consisting of plural bands 63 (seven bands 0-6 in the present embodiment) each extended along a direction A. Each band consists of an array of plural blocks 6 (14 blocks 0-13 in the present embodiment), and each block is given a band number and a block number as illustrated. An arrow A indicates the moving direction of the optical card 61 at the reproduction of information, and an arrow C indicates the direction of information scanning by an optical head in said reproduction.

Figure 8:
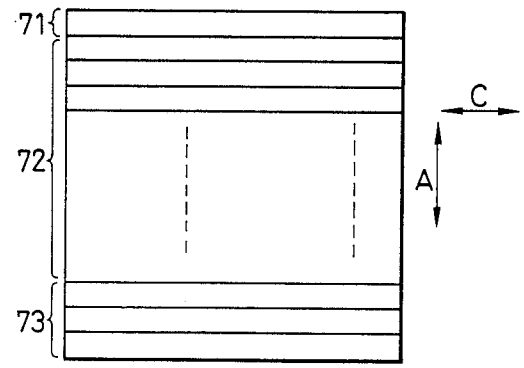
FIG. 8 is a magnified view of a block thereof.

FIG. 8 is a magnified view of a block of said optical card 61.

As shown in FIG. 8, each block is composed of a parallel array of plural tracks, and consists of a block mark track 71, a data track area 72 composed of plural data tracks, and an error correction code (ECC) track area 73 composed of plural ECC tracks.

Said block mark track, placed at the start of a block, records said band number and block number and is used for separating and idenifying the blocks and for indicating the start of a block.

Said data track area 72 and the error correction code track area 73 constitute a user area, and the data tracks and the error correction code tracks can be used for recording data for the user if the error correction codes are not attached to the data. On the other hand, if the error correction codes are attached to the data, the error correction code data are recorded in a part of the data track area 72 and in the error correction code track area 73. The information reproducing apparatus of the present embodiment processes the error correction code data block by block.

FIG. 9 shows the structure of said block mark track 71.

As shown in FIG. 9, the block mark track is composed of a synchronization signal portion, a reference line portion, a start bit portion, a mark signal portion, a band number portion, a block number portion, a ECC data portion, a track number portion, a data parity portion, a track parity portion and a dummy data portion.

FIG. 10 shows the structure of said data track.

As shown in FIG. 10, the data track is composed of a synchronization signal portion, a reference line portion, a start bit portion, a user data portion, a ECC data portion, a track number portion, a data parity portion, a track number parity portion and a dummy data portion. If the error correction code is not attached, the ECC data portion can be used as the user data portion.

The ECC data track is constructed the same as the data track, except that the user data portion in FIG. 10 is replaced by an ECC data portion.

The above-mentioned dummy data portion is used for accommodating a signal smaller than the smallest unit 1T that may appear at the end, for example, in the case of an MFM modulated information, and is disregarded at the information reading.

FIG. 11 is a partial magnified view of the recording area of said optical card.

As shown in FIG. 11, each track 80 is composed of a preamble area 101 (corresponding to the synchronization signal portion), a discrimination area 102 (corresponding to the reference line portion), an information area 103 and a parity word area 104.

FIG. 12 is a partial magnified view of said track 80.

As shown in FIG. 12, the information area 103 is composed of a start bit 130 at the beginning and a following information portion 131 of several bytes.

In the above-explained block mark track shown in FIG. 9, the mark signal portion, band number portion, block number portion and ECC data portion constitute said information portion 131, while the track number portion, data parity portion, track number parity portion and dummy data portion constitute said parity word area 104. Similarly in the above explained data track shown in FIG. 10, the user data portion and ECC data portion constitute said information portion 131, and the track number portion, data parity portion, track number parity portion and dummy data portion constitute said parity word area 104.

Said information area 103 and the parity word ares 104 store MFM modulated signals.

As shown in FIGS. 11 and 12, the reference line portion 102 consists of a bit train "10111101" consecutive in the direction C, and the central consecutive four bits "1" have a width in the direction A of about half that of the ordinary information bits, and are positioned at the approximate center of the track in the direction A.

In the following, there will be explained the function of the apparatus of the present embodiment shown in FIG. 6, in the reproduction of information recorded on the above-described optical card.

Referring to FIG. 6, a sensor array 10 is driven by a drive clock signal 157 from a sensor array driver 151, and the output signal 158 from said sensor array is amplified in said driver 151 and supplied as a video signal 159 to a binary digitizing circuit 152. A binary digitized NRZI signal 160 from said circuit 152 is supplied to a discriminating area detector circuit 153 and an information demodulation circuit 154.

FIG. 13 illustrates the function of said discriminating area detector circuit 153.

FIG. 13 there are shown three tracks 212-a, 212-b, 212-c consecutive in the direction A, and the above-mentioned discrimination area 102. Lines 215, 216 indicate the positions of the line sensor with respect to the optical card 1. The line 215 indicates the on-track state of the line sensor, in which the line sensor is correctly aligned on the track of the optical card, thus enabling the data reading, while the line 216 indicates the off-track state of the line sensor.

FIG. 14(a) shows the output of the line sensor corresponding to the above-mentioned discriminating area 102 in said on-track state, while FIG. 14(b) shows said output in said off-track state. In said on-track state there appears a bit inversion interval of 4T which does not exist in the information area 103 or in the parity word area 104, so that such on-track state can be discriminated by the detection of such signal. In the off-track state there appears a bit inversion interval of 6T. The detection of this signal, followed by the above-mentioned bit inversion interval of 4T, identifies the movement of the sensor array to a position corresponding to a new track.

FIG. 15 explains the function of the above-mentioned information demodulator circuit 154.

In FIG. 15, (a) shows the aforementioned NRZI signal 160 in the on-track state, wherein signals 101', 102', 103', 104', 130' and 131' are respectively obtained from the preamble area 101, discriminating area 102, information area 103, parity word area 104, start bit 130 and information portion 131 shown in FIGS. 11 or 12.

In FIG. 15, (b) indicates an on-track state signal 164 supplied from said discriminating area detector circuit 153 to the information demodulator circuit 154.

Simultaneously with the entry of said on-track state signal 164, the information demodulator circuit 154 generates a gate signal as shown in FIG. 15(c). The first signal "1" detected in said NRZI signal 160 during said gate signal is identified as the start bit signal 130, and the demodulation of information is started from the next bit.

In FIG. 15, (d) indicates the demodulation signal 162 obtained in the information demodulator circuit 154 and supplied, as shown in FIG. 6, to the parity check circuit 155 and the information intake circuit 156.

In the following there will be explained the function of said parity check circuit 155.

FIG. 16 shows the details of a part of the data track of the aforementioned optical card.

In the present embodiment, the user data portion shown in FIG. 10 records three user data "Data 1", "Data 2" and "Data 3" in divided manner, and the data parity portion shown in FIG. 10 records data "Parity 1" corresponding to the Data 1, data "Parity 2" corresponding to the Data 2, data "Parity 3" corresponding to the Data 3, and data "Parity 4" corresponding to the ECC data, in consecutive manner. Following said Parity 4 data, there are recorded data "Track number parity" corresponding to the track number.

FIGS. 17A and 17B schematically illustrate the function of the above-mentioned parity check circuit 155.

In said circuit, as shown in FIG. 17(a), the parity values calculated from the demodulated signals of the above-mentioned Data 1, Data 2, Data 3 and ECC data are respectively compared with the parity bit values demodulated from said Parity 1, Parity 2, Parity 3 and Parity 4 in exclusive-OR gates 403-1, 403-2, 403-3, 403-4 to obtain the results of said comparisons.

Also in said parity check circuit, as shown in FIG. 17B, the parity value calculated from the demodulated signal of the above-mentioned track number is compared with the parity bit value of the demodulated signal of the above-mentioned track number parity data in an exclusive-OR gate 407, which releases the result of said comparison.

Figure 18:
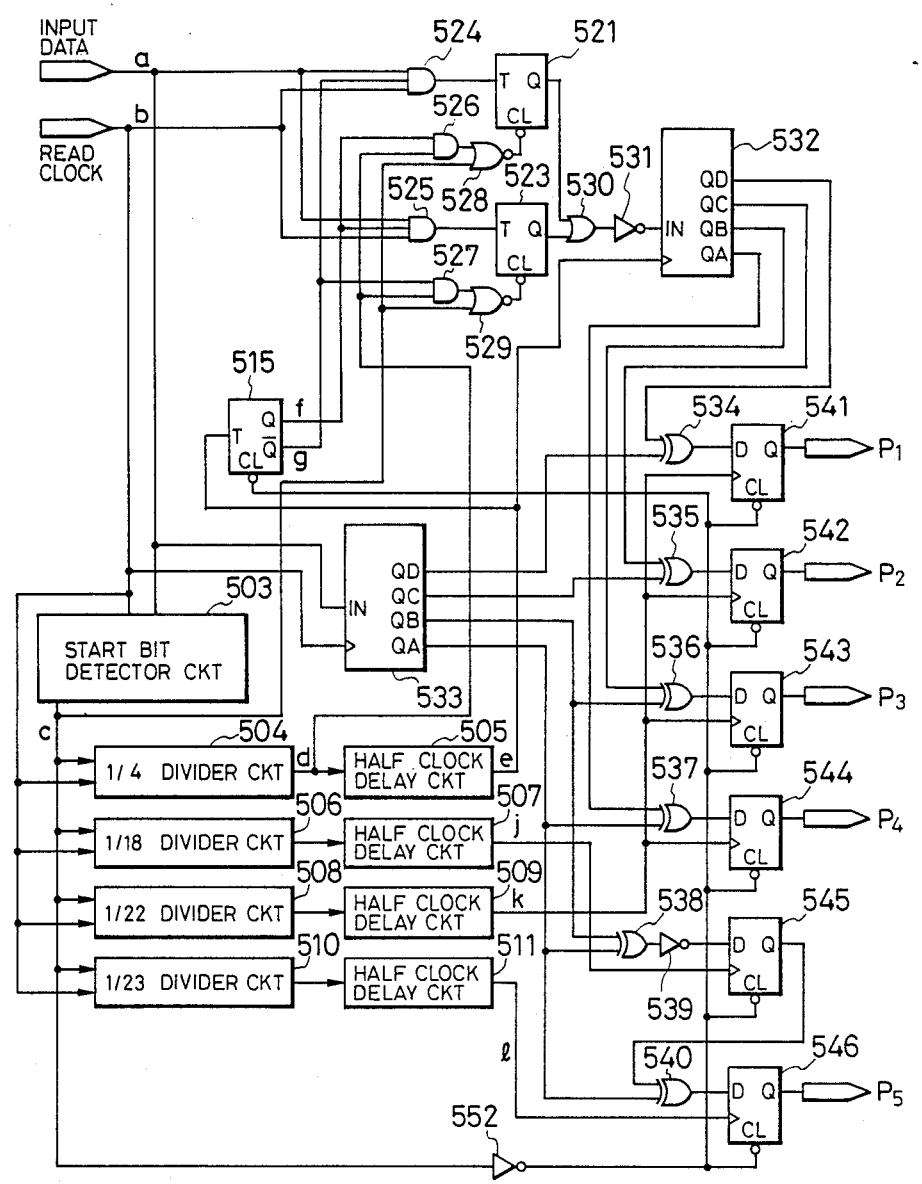
FIG. 18 is a block diagram of an essential part of a circuit for parity counting and parity comparison in the parity check circuit.

FIG. 18 is a block diagram of an essential part of a circuit for the above-mentioned parity calculation and parity comparison in the parity check circuit 155.

Figure 19:
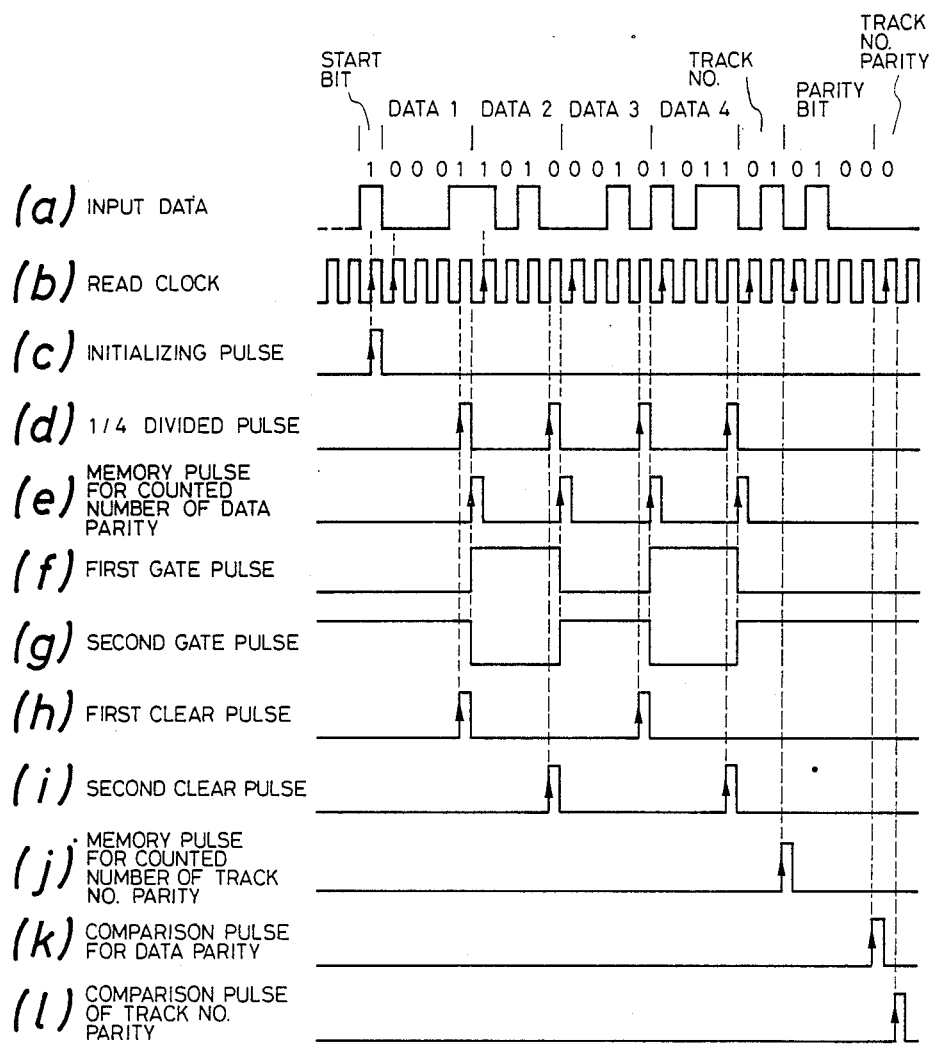
FIGS. 19a through l are a pulse charts for explaining the function of the parity check circuit.

FIG. 19 is a pulse chart showing the function of said circuit. In the following there will be explained the function of said circuit, while making reference to FIGS. 18 and 19.

FIG. 19(a) shows an example of input data a, consisting of a start bit "1", Data 1 "0001", Data 2 "1010", Data 3 "0010", Data 4 (ECC data) "1011", a track number "01", parity bit data "0100" and a track number parity bit "0". The parity bit data records, in consecutive manner, the odd parity bits of the Data 1, Data 2, Data 3 and Data 4.

FIG. 19(b) shows an example of the reading clock signal b entered in synchronization with the above-mentioned input data.

As shown in FIG. 18, said input data a and read clock signal b are supplied to a start bit detector circuit 503 which, upon detection of the start bit in the input data a, releases an initializing pulse c as shown in FIG. 19(c). As shown in FIG. 18, said initializing pulse c is supplied to a ¼ frequency divider circuit 504, a 1/18 frequency divider circuit 506, a 1/22 frequency divider circuit 508 and a 1/23 frequency divider circuit 510, which also receive said read clock signal b and count the number of pulses thereof upon reception of said initializing pulse c.

The ¼ frequency divider circuit 504 releases a pulse as shown in FIG. 19(d) for every four pulses of the read clock signal b. Said released pulse signal is supplied to a half clock delay circuit 505, which releases a memory pulse for data parity count as shown in FIG. 19(e).

The 1/18 frequency divider circuit 506 releases a pulse for every 18 pulses of the read clock signal b, and said released pulse is supplied to a half clock delay circuit 507, which releases a track number parity count pulse j as shown in FIG. 19(j).

The 1/22 frequency divider circuit 508 releases a pulse for every 22 pulses of the read clock signal b, and said released pulse is supplied to a half clock delay circuit 509, which releases a pulse k for comparing the data parity count and the parity bit value as shown in FIG. 19(k).

The 1/23 frequency divider circuit 510 releases a pulse for every 23 pulses of the read clock signal b, and said released pulse is supplied to a half clock delay circuit 511, which releases a pulse 1 for comparing the parity count of the track number and the parity bit value, as shown in FIG. 19(l).

The output signal e of said half clock delay circuit 505 is supplied to a T-flip-flop 515 which is initialized by the initializing pulse c to a state with an output signal Q at "0" and another output signal $\overline{Q}$ at "1". At the start edge of said pulse signal, the output signals are inverted respectively from "0" to "1" and from "1" to "1". Consequently the output signal Q of said flip-flop provides a first gate pulse f as shown in FIG. 19(f), and the output signal $\overline{Q}$ provides a second gate pulse g as shown in FIG. 19(g).

The above-mentioned input data a, read clock signal b and second gate pulse g are supplied to a three-input AND gate 524, which releases the clock pulses only when said input data is "1", except during the entry of the Data 2 and Data 4. Thus, a pulse is released in response to the Data 1 "0001", and another pulse is released in response to the Data 3 "0010".

The output signal of said AND gate 524 is supplied to a first T-flip-flop 521, which is at first initialized by the initializing pulse c from the start bit detector circuit 503, whereby the output signal Q thereof is reset to "0". Since a pulse is received in response to the Data 1 "0001" in said initial state "0", said flip-flop thereafter releases an output signal Q="1".

The parity of the Data 1 "0001" is counted in this manner, and the obtained count "1" is inverted to "0" by a NOT gate 531 and supplied to a 4-bit shift register 532. Said shift register receives the memory pulse e from the half clock delay circuit 505, and, in response to the first one of said memory pulses, the parity count "0" corresponding to the Data 1 "0001" is stored at an output QA.

Also as shown in FIG. 18, the ¼-divided pulse d and the first gate pulse f are supplied to an AND gate 526, and, in response to the output thereof, the above-mentioned first flip-flop 521 receives a second clear pulse i as shown in FIG. 19(i). Consequently, after the parity count of the Data 1 from said first flip-flop 521 is stored in the shift register 532, the first flip-flop 521 is cleared by the first one of said second clearing pulses.

Similarly, the above-mentioned input data a, read clock signal b and first gate pulse f are supplied to a three-input AND gate 525, which releases clock pulses at the entry of the Data 2 and Data 4 and only when said entry is "1". Therefore, two pulses are released in response to the Data 2 "1010", and three pulses are released in response to the Data 4 "1011".

The output of said AND gate 525 is supplied to a second T-flip-flop 523, which is at first initialized by the initializing pulse c from the start bit detecting circuit 503 to a state with an output Q="0". As two pulses are received in response to the Data 2 "1010" in said initial state Q="0", the flip-flop 523 thereafter releases the output Q="0".

The parity of the Data 2 "1010" is counted in this manner, and the value "0" thereof is inverted to "1" by the NOT gate 531 and supplied to the above-explained 4-bit shift register 532. In response to the second one of the aforementioned memory pulses e from the half clock delay circuit 505, the parity "1" of the Data 2 "1010" is stored at the output QA, and the value that has been stored at the output QA is shifted up to an output QB.

As shown in FIG. 18, the ¼ divided pulse d and the second gate pulse g are supplied to an AND gate 527, and, in response to the output signal thereof, said second flip-flop 523 receives a first clearing pulse h as shown in FIG. 19(h). Consequently, after the parity count of the Data 2 from said second flip-flop 523 is stored in the shift register 532, said flip-flop 523 is cleared by the second one of said first clearing pulses.

The parity value is counted for the Data 3 and Data 4 in a similar manner as that for the Data 1 and Data 2. Consequently, at the completion of the Data 1 to 4, the outputs QD, QC, QB and QA of said shift register 532 respectively store the parity counts of the data 1, Data 2, Data 3 and Data 4.

The parity counts thus counted and stored at QD, QC, QB and QA are respectively supplied to input terminals of exclusive OR gates 534, 535, 536 and 537.

The above-mentioned input data a and the read clock signal b are also supplied to a 4-bit shift register 533 which converts serial data into parallel data with a least significant bit QA and a most significant bit QD.

The outputs QD, QC, QB and QA of said shift register 533 are respectively supplied to the other input terminals of the above-mentioned exclusive OR gates 534, 535, 536 and 537.

The outputs of said exclusive OR gates 534, 535, 536 and 537 are respectively supplied to D-flip-flops 541, 542, 543 and 544.

As shown by FIG. 19(k), the comparison pulse k is released from the half clock delay circuit 509 after the 22nd one of the read clock signal b and supplied to said flip-flops 541, 542, 543 and 544. At this point the outputs QD, QC, QB, QA of the shift register 533 respectively represent parity bit values "0", "1", "0", "0" of the Data 1, Data 2, Data 3 and Data 4 in the input data a.

Therefore, in response to said comparison pulse k, the result of comparison of the parity value counted on the Data 1 and the parity bit value of said data is stored in the output Q of the flip-flop 541. Said result P1 of comparison indicates the absence of error in the Data 1 in the case of "0", or the presence of error in the case of "1".

Similarly, in response to said comparison pulse k, the result of comparison of the parity value counted on the Data 2 and the parity bit value of said data is stored in the output Q of the flip-flop 542. Said result P2 of comparison indicates the absence of error in the Data 2 in case of "0", or the presence of error in case of "1".

Similarly, in response to said comparison pulse k, the result of comparison of the parity value counted on the Data 3 and the parity bit value of said data is stored in the output Q of the flip-flop 543. Said result P3 of comparison indicates the absence of error in the Data 3 in the case of "0", or the presence of error in the case of "1".

Similarly, in response to said comparison pulse k, the result of comparison of the parity value counted on the Data 4 and the parity bit value of said data is stored in the output Q of the flip-flop 544. Said result P4 of comparison indicates the absence of error in the Data 4 in case of "0", or the presence of error in case of "1".

The outputs QB, QA of said shift register 533 are supplied also to an exclusive OR gate 538, of which output is supplied, through a NOT gate 539, to a D-flip-flop 545. As shown in FIG. 19(j), the memory pulse j is released from the half clock delay circuit 507 after an 18th pulse of the read clock signal b and supplied to said flip-flop 545. At this point the outputs QB, QA of the shift register 533 indicates the track number "0", "1", whereby the exclusive OR gate 538 releases the practical parity count "1" of said track number. Said count is inverted to "0" in a NOT gate 539 and stored in the output Q of the above-mentioned flip-flop 545.

The output Q of said flip-flop 545 is supplied to an input terminal of an exclusive OR gate 540, of which the other input terminal receives the output QA of the shift register 533, and the output of said gate is supplied to a D-flip-flop 546. As shown in FIG. 14(l), the comparison pulse l is released from the half clock delay circuit 511 after the 23rd pulse of the read clock signal b and supplied to the above-mentioned flip-flop 546. At this point the output QA of the shift register 533 represents the track number parity bit value "0", so that the result of comparison of the parity value counted from the track number in response to said comparison pulse l and the parity value of said track number is stored in the output Q of the flip-flop 546. Said result P5 of comparison indicates the absence of error in the input track number in case of "0", or the presence of error in case of "1".

In FIG. 18, reference numerals 528 and 529 are two-input NOR gates, 530 is a two-input OR gate, and 552 is a NOT gate.

In the present embodiment, the parity bit is attached to every 4 bits, but it is also possible to attach the parity bit to every 8 bits, every 16 bits or every unit having an arbitrary number of bits. In the present embodiment, there have been processed four information signals of 4 bits each, but the parity counting and the parity check can be achieved in a similar manner for information signal units of any number of bits.

Figure 20A:
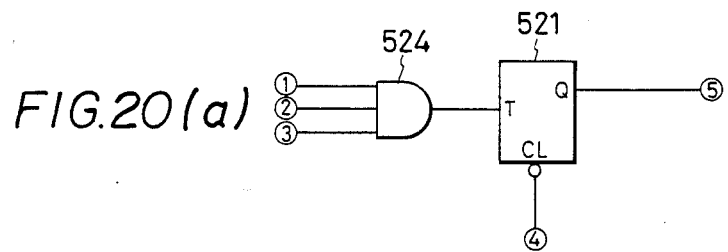
FIGS. 20a through e are circuit diagrams showing examples of the parity counting circuit.

In the present embodiment, the parity counting circuit is provided with two sets of circuits each having a three-input AND gate 524 and a flip-flop 521 as shown in FIG. 20(a) and these two sets are alternately used, so that the circuit structure is not complicated even when the signal unit, to which the parity bit is to be attached, is increased.

In FIGS. 20, (b) to (e) illustrate examples of the parity counting circuit achieving the same function as that of the circuit shown in FIG. 20(a).

Figure 20B:
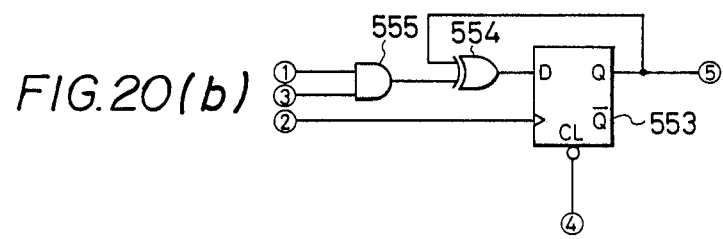

In the circuit shown in FIG. 20(b), there are provided a two-input AND gate 555, an exclusive OR gate 554, and a D-flip-flop 553.

Figure 20C:
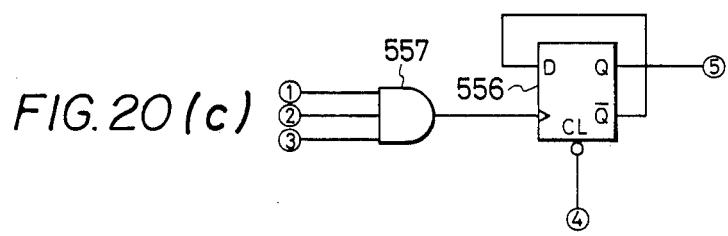

In the circuit shown in FIG. 20(c), there are provided a three-input AND gate 557, and a D-flip-flop 556.

Figure 20D:
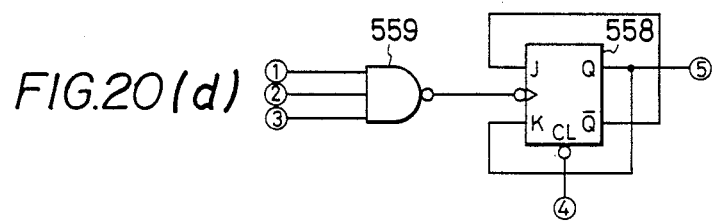

In the circuit shown in FIG. 20(d), there are provided a three-input NAND gate 559, and a JK-flip-flop 558.

Figure 20E:
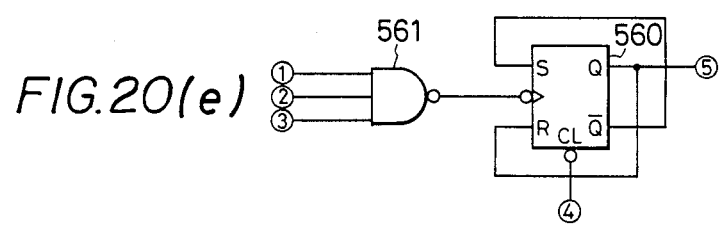

In the circuit shown in FIG. 20(e), there are provided a three-input NAND gate 561, and an RS-flip-flop 560.

In FIG. 20, (1) to (5) indicate input/output terminals, wherein (1) is an input terminal for the input data, (2) is an input terminal for the read clock signal, (3) is an input terminal for the gate pulse, (4) is an input terminal for the clear signal, and (5) is an output terminal.

In the present embodiment, two flip-flops are employed in the parity counting circuit for alternate parity counting, but it is also possible to achieve the same function as in the present embodiment with only one flip-flop, by using said flip-flop for parity counting operations in successive manner and resetting said flip-flop immediately after the obtained count is recorded.

Such parity counting method will be explained in greater detail in another embodiment to be explained later.

The number of parity errors in each information reading, determined in the parity check circuit 155, is supplied, as a signal 163 shown in FIG. 6, to the information intake circuit 156.

Said information intake circuit 156 also receives a new track signal 161 indicating the movement to a new track, obtained from the discrimination area detector circuit 153, and the demodulated information signal 162. In a period from the entry of said new track signal 161 to the entry of a next new track signal, the information intake circuit 156 accepts, among the demodulated signals 162 obtained corresponding to plural information readings, the one with the least number of parity errors as the information of highest accuracy. The information accepted by said information intake circuit is released at a desired time by suitable means.

The foregoing embodiment employs an optical card as the information recording medium, but the present invention is applicable also to the optical information reproducing apparatus employing other information recording media, or even to the apparatus for reproducing non-optical information, as long as there is employed a process of repeating the same information plural times and selecting one of said plural readings as the reproduction signal.

As there can be selected a signal with least parity errors by counting, in succession, the parity of each unit data through the control of clock signal input to a flip-flop by the input data signal, it is rendered possible to reproduce a signal of highest accuracy among plural readings of same information.

In the following there will be explained a second embodiment, in which the parity counting circuit is modified from the structure shown in FIG. 18.

Figure 21:
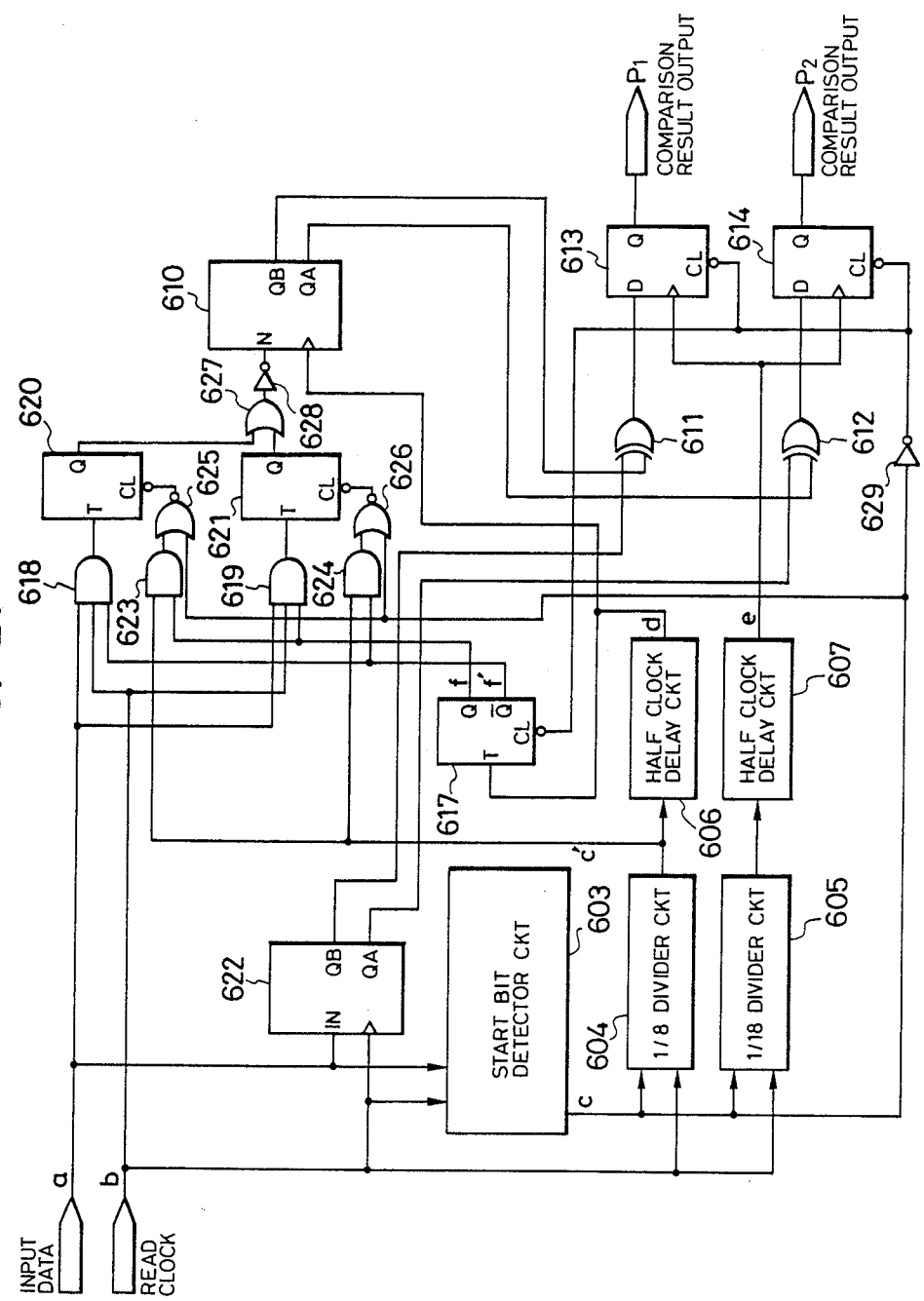
FIG. 21 is a block diagram showing an essential part of a parity check circuit employed in a second embodiment of the present invention.
Figure 22:
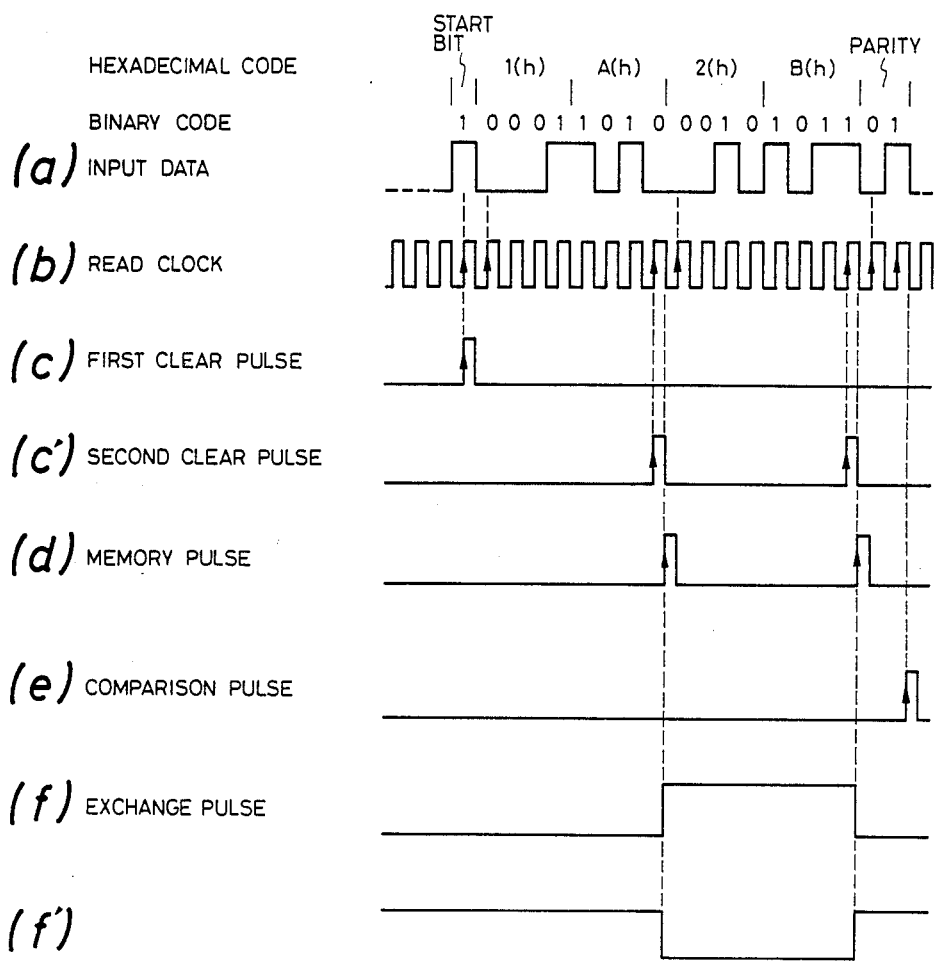
FIGS. 22a through f are pulse charts for explaining the function of said circuit.

FIG. 21 is a block diagram showing the essential part of the parity check circuit of the apparatus constituting said second embodiment, and FIG. 22 is a pulse chart showing the function of said circuit. In the following there will be explained said function while making reference to FIGS. 21 and 22.

FIG. 22(a) shows an example of the input data a, composed of a two-byte signal representing hexadecimal numbers "1A(h)" and "2b(h)". In this case, the ECC data, the track number and the corresponding parity bit are not provided.

FIG. 22(b) shows an example of the read clock signal entered in synchronization with said input data.

As shown in FIG. 21, the input data a and the read clock signal b are supplied to a start bit detector circuit 603, which, upon detection of the start bit in the input data a, releases a first clearing pulse c shown in FIG. 22(c).

As shown in FIG. 21, said first clearing pulse c is supplied to a ⅛ frequency divider circuit 604 and a 1/18 frequency divider circuit 605, which also receive the above-mentioned read clock signal b and count the number of pulses thereof in response to the entry of said first clearing pulse c.

Said ⅛ frequency divider circuit 604 releases a second clearing pulse shown in FIG. 22(c') for every 8 pulses of the read clock signal b. Said output pulse is supplied to a half clock delay circuit 406, which releases a memory pulse d' for the parity count, as shown in FIG. 22(d'). Also said 1/18 frequency divider circuit 605 releases an output pulse for every 18 pulses of the read clock signal b, and said output pulse is supplied to a half clock delay circuit 407 which releases a comparison pulse e for comparing the parity count value and the parity bit value, as shown in FIG. 22(e).

The output signal d of said half clock delay circuit 606 is supplied to a T-flip-flop 617 which is at first cleared by the first clearing pulse c to a state with an output Q=(0(2)) and another output Q̄=(1(2)). At the start edge of the pulse, the output state of said flip-flop is inverted so that the output signal is changed from (1(2)) to (0(2)) or from (0(2)) to (1(2)). Consequently the output Q of said flip-flop varies from (0(2)) to (1(2)) at the start of the first memory pulse d, and from (1(2)) to (0(2)) at the second memory pulse d, thus forming a switching pulse f shown in FIG. 22(f). Similarly, the output Q̄ of said flip-flop varies from (1(2)) to (0(2)) at the start of the first memory pulse d and from (0(2)) to (1(2)) at the start of the second memory pulse d, thus forming a switch pulse f' shown in FIG. 22(f').

The input data a, read clock signal b and switch pulse f' mentioned above are supplied to a three-input AND gate 618, which thus releases a clock pulse during the above-mentioned data (1A(h)) and only when said data are in a state (1(2)). Thus, three pulses are released for the above-mentioned data (1A(h)).

The output signal of said AND gate 618 is supplied to a first T-flip-flop 620, which is at first cleared by the first clearing pulse c from the start bit detector circuit 603 to a state with an output signal Q=(0(2)). Since three pulses are received corresponding to hexadecimal data (1A(h)) in the initial state (0(2)), the output Q of the flip-flop 620 thereafter assumes a state (1(2)).

The parity of the hexadecimal data (1A(h)) is counted in this manner, and the value (1(2)) thereof is inverted to (0(2)) by a NOT gate 628 and supplied to a 2-bit shift register 610. It also receives the above-mentioned memory pulse d from the half clock delay circuit 606, so that the parity count (0(2)) of the data (1A(h)) is stored at the output QA in response to the first memory pulse.

Said first flip-flop 620 is reset by the second one of said second clearing pulses c'.

Similarly, the input data a, the read clock signal b and the switch pulse f mentioned above are supplied to a three-input AND gate 619, which thus releases the clock pulses during the entry of the above-mentioned data (2B(h)) and only when said data are at a state (1(2)). Thus, four pulses are released in response to the data (2B(h)).

The output signal of said AND gate 619 is supplied to a second T-flip-flop 621, which is at first cleared by the first clearing pulse c from the start bit detector circuit 603 to a state with an output signal Q=(0(2)). Since four pulses are received in response to the hexadecimal data (2B(h)) at the initial state (0(2)), the output Q of the flip-flop 621 assumes a state (0(2)).

The parity of the hexadecimal data (2B(h)) is counted in this manner, and the value (0(2)) thereof is inverted to (1(2)) by a NOT gate 628 and supplied to the above-mentioned 2-bit shift register 610. Thus, in response to the second one of the memory pulses d released from said half clock delay circuit 406, the parity count (1(2)) of the data (2B(h)) is stored at the output QA, and, at the same time, the value which has been stored at said output QA is shifted up to the output QB.

The parity counts counted as explained above and stored at the outputs QA, QB are supplied to the input terminals of exclusive OR gates 611, 612.

The input data a and the read clock signal b mentioned above are also supplied to a 2-bit shift register 622 which converts serial data into 2-bit parallel data with QA at the lower bit and QB at the upper bit.

The outputs QB, QA of said shift register 622 are respectively supplied to the other input terminals of said exclusive OR gates 611, 612.

The output signals of said exclusive OR gates 611, 612 are respectively supplied to D-flip-flops 613, 614.

As shown in FIG. 22(e), the comparison pulse e is supplied from the half clock delay circuit 607, after the 18th pulse of the read clock signal b, to said flip-flops 613, 614. At this point, the outputs QB, QA of said shift register 622 represent the parity bit values (0(2)) and (1(2)) of the input data a. Therefore, in response to said comparison pulse e, the result of comparison of the parity value counted from the hexadecimal data (1A(h)) and the parity bit value of said data is stored in the output Q of the flip-flop 613. The result p1 of said comparison indicates the absence of error in the input data in case of (0(2)), or the presence of error in case of (1(2)). Similarly, in response to said comparison pulse e, the result of comparison between the parity value counted from the hexadecimal data (2B(h)) and the parity bit value of said data is stored in the output Q of the flip-flop 614. The result p2 of said comparison indicates the absence of error in the input data in case of (0(2)), or the presence of error in case of (1(2)).

In FIG. 21, reference numerals 623 and 624 are two-input AND gates; 625 and 626 are two-input NOR gates; 627 is a two-input OR gate; and 629 is a NOT gate. Naturally the combination of the flip-flop and the AND gate may be replaced by one of the circuits shown in FIGS. 20(b) to 20(e).

In the following there will be explained a third embodiment in which the parity counting circuit is modified from the structure shown in FIG. 18.

Figure 23:
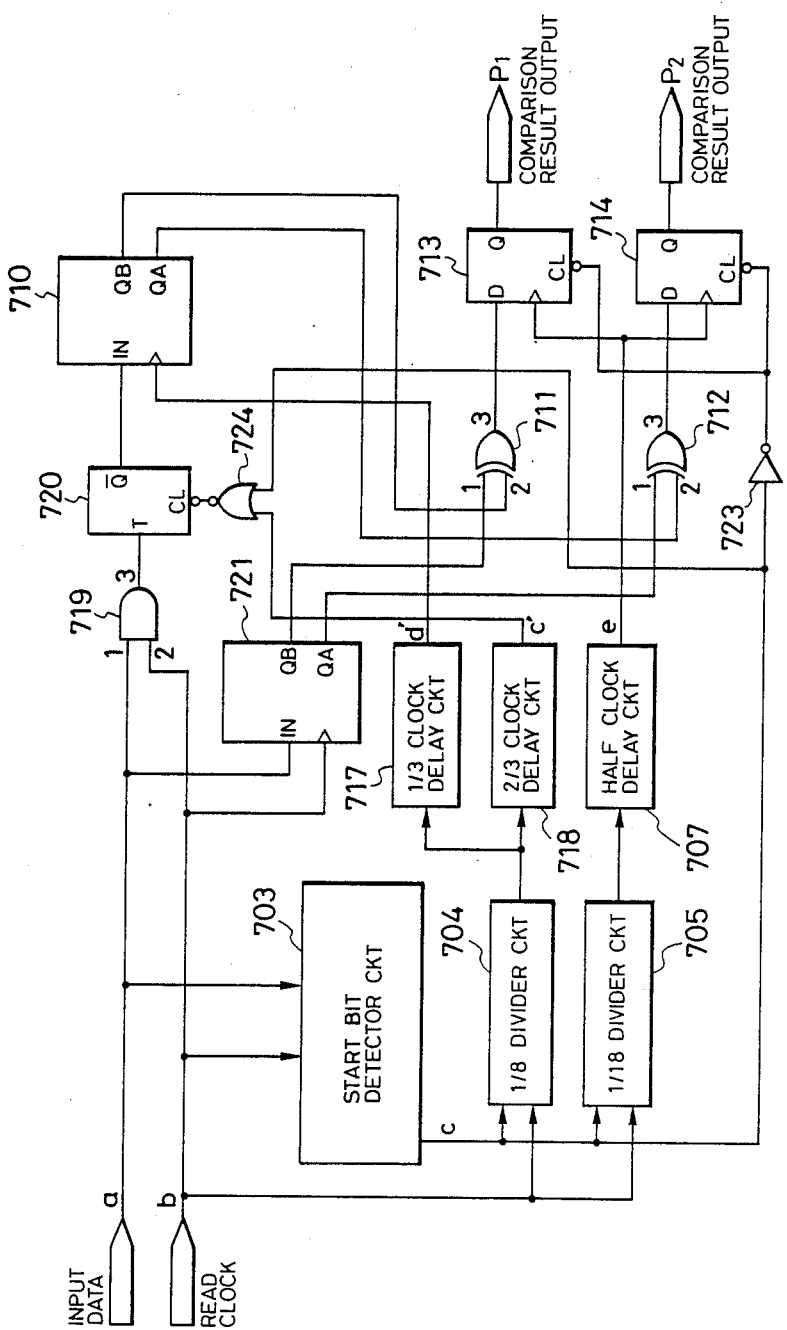
FIG. 23 is a block diagram showing an essential part of a parity check circuit employed in a third embodiment of the present invention.
Figure 24:
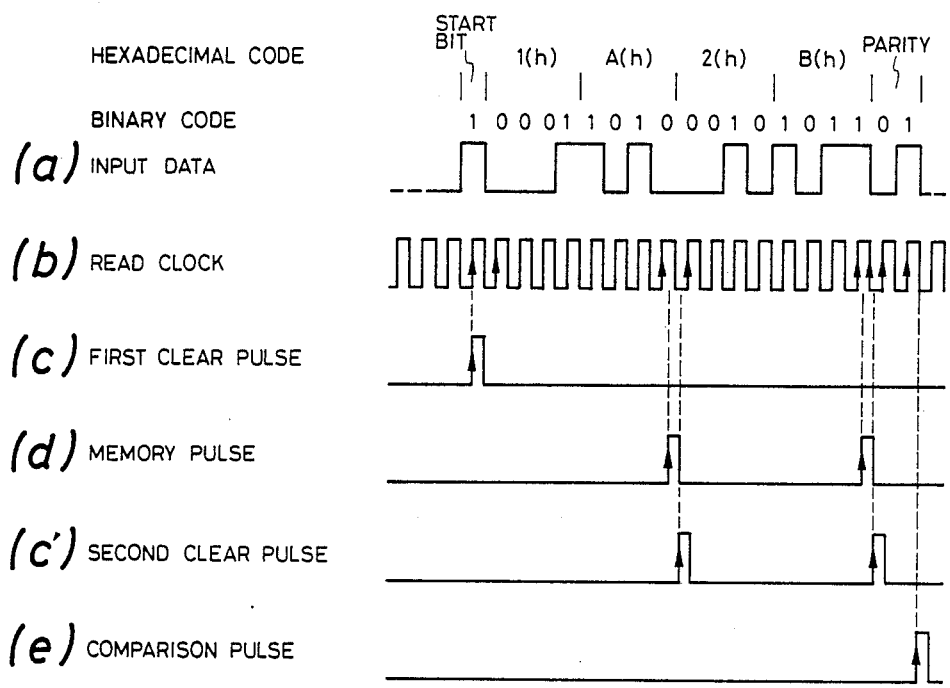
FIGS. 24a through e are pulse charts for explaining the function of said circuit.

FIG. 23 is a block diagram showing the essential part of the parity check circuit in the third embodiment of the present invention, and FIG. 24 is a pulse chart showing the function thereof. In the following there will be explained the function of said circuit, while making reference to FIGS. 23 and 24.

FIG. 24(a) shows an example of the input data a, composed of two-byte signal representing hexadecimal numbers "1A(h)" and "2B(h)". In this case the ECC data, the track number and the corresponding parity bit are not provided.

FIG. 24(b) shows an example of the read clock signal entered in synchronization with said input data.

As shown in FIG. 23, the input data a and the read clock signal b are supplied to a start bit detector circuit 703, which, upon detection of the start bit in the input data a, releases a first clearing pulse c shown in FIG. 24(c).

As shown in FIG. 23, said first clearing pulse c is supplied to a ⅛ frequency divider circuit 704 and a 1/18 frequency divider circuit 705, which also receive the above-mentioned read clock signal b and count the number of pulses thereof in response to the entry of said first clearing pulse c.

Said ⅛ frequency divider circuit 704 releases an output pulse at every 8 pulses of the read clock signal b, and said output pulse is supplied to a ⅛ clock delay circuit 717 and ⅜ clock delay circuit 718. Said ⅛ clock delay circuit 717 releases a memory pulse d' for the parity count as shown in FIG. 24(d'), while said ⅜ clock delay circuit 718 releases a second clearing pulse c' as shown in FIG. 24(c'). On the other hand, the 1/18 frequency divider circuit 705 releases an output pulse at every 18 pulses of the read clock signal b, and said output pulse is supplied to a half clock delay circuit 707 which releases a comparison pulse e, as shown in FIG. 24(e), for comparing the parity count with the parity bit value.

The input data a and the read clock signal b mentioned above are also supplied to a two-input AND gate 719, which thus releases the clock pulses only when the input signal is at a level (1(2)). Therefore, there are released three pulses in response to the data (1A(h)), and four pulses in response to the data (2B(h)).

The output signal of said AND gate 719 is supplied to a T-flip-flop 720, which is at first cleared by the first clearing pulse c, supplied from the start bit detector circuit 703, to a state with the output signal $\overline{Q}$=(1(2)). The output state of said flip-flop is changed at the start edge of a pulse from (1(2)) to (0(2)) or from (0(2)) to (1(2)). Since three pulses are received corresponding to the hexadecimal data (1A(h)) in the initial state (1(2)), the output $\overline{Q}$ of the flip-flop 720 thereafter assumes a state (0(2)), indicating the parity count of said data (1A(h)). Also, for the hexadecimal data (2B(h)), four pulses are received in the initial state (1(2)), the output $\overline{Q}$ of the flip-flop 720 assumes a state (1(2)), indicating the parity count of said data (2B(h)).

The parity of the hexadecimal data (1A(h)) is counted in this manner, and the value (0(2)) thereof is supplied to a 2-bit shift register 710. It also receives the above-mentioned memory pulse d' supplied from the ⅛ clock delay circuit 717, and the parity count (0(2)) of the data (1A(h)) is stored at the output QA in response to the first one of said memory pulses d'. Subsequently, the flip-flop 720 is cleared to a state $\overline{Q}$=(1(2)) by the first one of the second clearing pulses c'. Then the parity of the hexadecimal data (2B(h)) is counted as explained above, and the parity value (1(2)) thereof is supplied to the 2-bit shift register 710 and stored in the output QA in response to the second one of said memory pulses d'.

At the same time, the value which has beeen stored in the output QA is shifted up to the output QB. Subsequently the flip-flop 720 is cleared by the second one of the second clearing pulses c'.

The parity counts counted in the above-explained manner and stored in the outputs QB, QA are respectively supplied to the input terminals of exclusive OR gates 711, 712.

The input data a and the read clock signal b mentioned above are also supplied to a 2-bit shift register 721, which converts serial data into 2-bit parallel data with QA at the lower bit and QB at the upper bit.

The outputs QB, QA of said shift register 721 are respectively supplied to the other input terminals of said exclusive OR gates 711, 712, of which output signals are respectively supplied to D-flip-flops 713, 714.

As shown in FIG. 24(e), the comparison pulse e is supplied from the half clock delay circuit 707, after the 18th pulse of the read clock signal b, to said flip-flops 713, 714. At this point the outputs QB, QA of said shift register 721 represents the parity bit values (0(2)) and (1(2)) of said input data a. Thus, in response to said comparison pulse e, the result of comparison between the parity value counted from the hexadecimal data (1A(h)) and the parity bit value of said data is stored in the output Q of the flip-flop 713. Said result P1 of comparison indicates the absence of error in the input data in case of (0(2)), or the presence of error in case of (1(2)). Similarly, in response to said comparison pulse e, the result of comparison between the parity value counted from the hexadecimal data (2B(h)) and the parity bit value of said data is stored in the output Q of said flip-flop 714. Said output p2 of comparison indicates the absence of error in the input data in case of (0(2)), or the presence of error in case of (1(2)).

In FIG. 23, reference numerals 723 is a NOT gate; and 724 is a NOR gate.

In the foregoing embodiment, a parity bit is attached to every data unit of 8 bits, but it is also possible to attach the parity bit to a data unit of 16 bits or any other suitable number of bits. Also in the foregoing embodiment, an information signal of 2 bytes is processed, but the parity counting and parity check can be achieved in a similar manner for the information signal of any other quantity.

Also in the foregoing embodiment, there are employed a ⅛ clock delay circuit 717 and a ⅜ clock delay circuit 718, but two different delayed clock signals can be obtained from the output signal of the ⅛ frequency divider circuit 704 by suitably positioning the leading edge of the first one of the above-mentioned memory pulses d' and the leading edge of the first one of the above-mentioned second clearing pulses c' in this order within a period from the leading edge of the 8th pulse to that of the 9th pulse of the read clock signal.

In the foregoing embodiment, the parity counting circuit is composed, as shown in FIG. 25(a), of an AND gate 719 and a flip-flop 720, and is not complicated even when the data unit for parity bit addition is increased.

In FIG. 25(b) to (e) show examples of the parity counting circuit achieving a function same as that of the circuit shown in FIG. 25(a).

Figure 25:
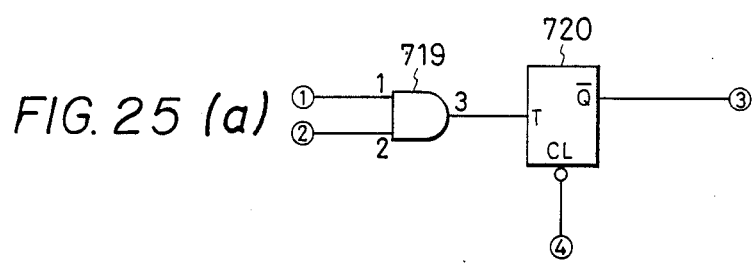
FIGS. 25a through e are circuit diagrams showing examples of the parity counting circuit.
Figure 25B:
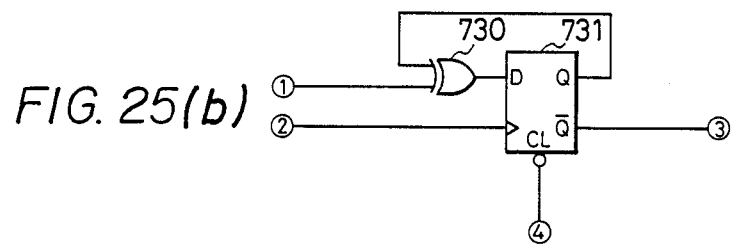

In FIG. 25(b), there are provided an exclusive OR gate 730 and a D-flip-flop 731.

Figure 25C:
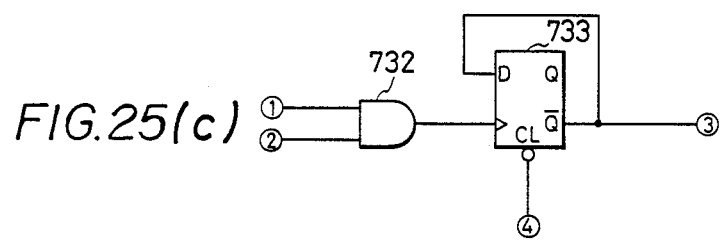

In FIG. 25(c), there are provided a two-input AND gate 732 and a D-flip-flop 733.

Figure 25D:
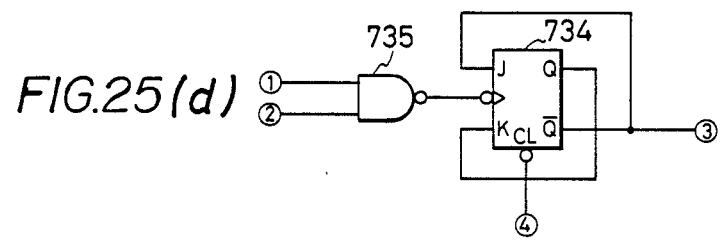

In FIG. 25(d), there are provided a two-input NAND gate 735 and a JK-flip-flop 734.

Figure 25E:
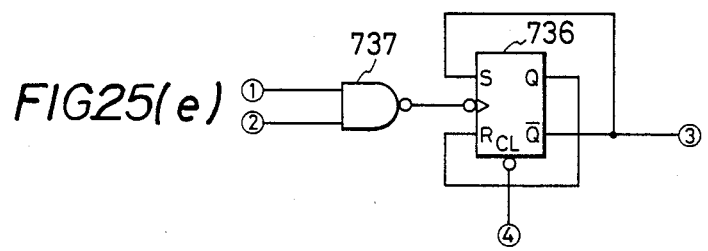

In FIG. 25(e), there are provided a two input NAND gate 737 and an RS-flip-flop 736.

In FIG. 25, (1) indicates the input data; (2) is the read clock signal, (3) is the output signal; and (4) is the clearing input signal.

As detailedly explained in the first, second and third embodiments of the present invention, the parity counting circuit is not complicated even when the data unit for parity bit addition is increased.

What is claimed is:

1. An information reproducing apparatus for reproducing information from an information recording medium containing plural digital information data units and a parity bit attached to each data unit, comprising:
   reader means for reading plural data units and parity bits of said information recording medium plural times;
   counter means for counting the parity of each of the plural data units read by said reading means, said counter means comprising flip-flop means and an output signal as a parity value being obtained by supplying a predetermined signal based on the data thus read to said flip-flop means;
   comparator means for comparing the parity value counted by said counter means with the parity bit value read by said reader means; and
   output means for selecting the read information with the least number of parity errors, based on the result of comparison by said comparator means.

2. An apparatus according to claim 1, wherein said counter means comprises clock generator means for generating a read clock signal synchronized with the data read by said reader means, and causes said flip-flop means to release the parity of each data unit based on the data read by said reader means and the read clock signal generated by said clock generator means.

3. An apparatus according to claim 2, wherein said flip-flop means comprises plural flip-flops which alternately count the parity of the data units based on said read clock signal.

4. An information reproducing process for reproducing information from an information recording medium containing plural digital information data units and a parity bit attached to each data unit, comprising the steps of:
   reading the plural data units and parity bits of said information recording medium plural times;
   counting the parity of each of the plural data units thus read, and a predetermined signal based on the data thus read being supplied to a flip-flop in said counting step to obtain an output signal as a parity value;
   comparing the parity value thus counted and the parity bit value thus read; and
   selecting the information with the least number of parity errors, based on the result of said comparing step.

5. A process for counting the parity of a serial digital signal from said digital signal and a read clock signal synchronized therewith, comprising the steps of:
   generating, from said read clock signal, switch pulses of a repeating period corresponding to the length of a data unit for which the parity is to be counted;
   controlling said read clock signal with said digital signal and then supplying said read clock signal to plural flip-flops by means of switching pulses;
   clearing a flip-flop after a parity count of the data unit is obtained from said flip-flop; and
   obtaining the parity counts of the data units alternately from two flip-flops.

6. A process for counting the parity of a serial digital signal from said digital signal and a read clock signal synchronized therewith, comprising the steps of:
   supplying said read clock signal to a flip-flop under control with said digital signal;
   generating flip-flop clearing pulses, from said read clock signal, of a repeating period corresponding to the length of a data unit for which the parity is to be counted;
   clearing the flip-flop with said clearing pulse after a parity count of the data unit is obtained from said flip-flop; and
   repeating the above-mentioned steps to obtain the parities of the data units in succession.

7. An apparatus for outputting a signal in a predetermined form from a serial digital signal and a clock signal synchronized therewith, said apparatus comprising:
   plural signal output means for receiving a signal based on the digital signal and outputting a predetermined signal; and
   switching means for alternately supplying the signal based on the digital signal to said plural signal output means at a repeating period corresponding to the length of a data unit on the basis of the clock signal, said switching means clearing the signal supplied to said signal output means after the predetermined signal is obtained from said signal output means, and the signal in the predetermined form alternately obtained by the signal output means being switched by said switching means.

8. An apparatus according to claim 7, wherein said signal output means comprises a flip-flop which outputs a parity value of the data unit.

9. An apparatus for counting, from a serial digital signal and a clock signal synchronized therewith, a parity value of the digital signal, said apparatus comprising:
   flip-flop means for receiving a signal based on the digital signal and outputting the parity value; and
   clearing means for clearing input information by supplying a signal to said flip-flop means at a repeating period corresponding to the length of a data unit on the basis of the clock signal, said clearing means clearing said flip-flop means after the parity value is obtained from said flip-flop means, and the parity of the data unit being successively counted by repeating the output of the parity value and the clearing by said flip-flop means and said clearing means.

10. An information reproducing apparatus for reproducing and supplying information from an information recording medium containing plural digital information data units and a parity bit attached to each data unit, said apparatus comprising:
   means for reading the plural data units and parity bits of the recording medium;
   means for counting the parity of each of the plural data units read by said reading means, said counting means comprising a flip-flop and obtaining an output signal as the parity value by supplying a predetermined signal based on the data thus read to said flip-flop;
   means for comparing the parity value counted by said counting means with the parity bit value read by said reading means; and
   means for controlling said apparatus so that the read data information with the least number of parity errors is supplied, based on the result of comparison by said comparing means.

* * * * *

UNITED STATES PATENT AND TRADEMARK OFFICE
CERTIFICATE OF CORRECTION

PATENT NO. : 4,912,694

DATED : March 27, 1990

INVENTOR(S) : MASAKUNI YAMAMOTO

It is certified that error appears in the above-identified patent and that said Letters Patent is hereby corrected as shown below:

ON TITLE PAGE:

IN [54] TITLE

"VALVE" should read --VALUE--.

IN [56] REFERENCES CITED

FOREIGN PATENT DOCUMENTS, "54122602 4/1981" should read --54-122602 4/1981--.

SHEET 6 OF 14

FIG. 17B, "VALVE" should read --VALUE--.

COLUMN 1

Line 4, "VALVE" should read --VALUE--.

COLUMN 2

Line 14, "internal" should read --interval--.

COLUMN 4

Line 55, "a" should read --an--.
    Line 61, "a" should read --an--.

COLUMN 5

Line 29, "ares" should read --area--.
    Line 52, "FIG. 13" should read --In FIG. 13--.

UNITED STATES PATENT AND TRADEMARK OFFICE
CERTIFICATE OF CORRECTION

PATENT NO. : 4,912,694
DATED : March 27, 1990
INVENTOR(S) : MASAKUNI YAMAMOTO

It is certified that error appears in the above-identified patent and that said Letters Patent is hereby corrected as shown below:

COLUMN 11

Line 6, ""2b(h)"." should read --"2B(h)".--.

COLUMN 14

Line 21, "represents" should read --represent--.
    Line 33, "output p2" should read --output P2--.
    Line 36, "numerals" should read --numeral--.
    Line 60, "FIG. 25(b)" should read --FIG. 25, (b)--.

Signed and Sealed this

Eighteenth Day of August, 1992

Attest:

DOUGLAS B. COMER

Attesting Officer      Acting Commissioner of Patents and Trademarks